United States Patent
Alamshahi et al.

(10) Patent No.: US 9,161,388 B2
(45) Date of Patent: Oct. 13, 2015

(54) RADIO BASE STATION AND METHODS THEREOF

(75) Inventors: Babak Alamshahi, Järfälla (SE); Thomas Östman, Spånga (SE); Ulf Skärby, Lindingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 628 days.

(21) Appl. No.: 13/382,484

(22) PCT Filed: Dec. 7, 2011

(86) PCT No.: PCT/SE2011/051481
§ 371 (c)(1),
(2), (4) Date: Jan. 5, 2012

(87) PCT Pub. No.: WO2012/078102
PCT Pub. Date: Jun. 14, 2012

(65) Prior Publication Data
US 2013/0150113 A1    Jun. 13, 2013

Related U.S. Application Data

(60) Provisional application No. 61/420,502, filed on Dec. 7, 2010.

(51) Int. Cl.
| | | |
|---|---|---|
| H04W 52/40 | (2009.01) | |
| H04W 52/14 | (2009.01) | |
| H04W 52/38 | (2009.01) | |
| H04W 88/08 | (2009.01) | |

(52) U.S. Cl.
CPC ............ *H04W 88/085* (2013.01); *H04W 52/40* (2013.01); *H04W 52/143* (2013.01); *H04W 52/386* (2013.01)

(58) Field of Classification Search
CPC ..... H04W 36/08; H04W 16/32; H04W 24/08; H04W 72/0466; H04W 84/045; H04W 84/105; H04W 16/00; H04W 24/10; H04W 36/0083; H04W 36/04; H04W 36/10; H04W 76/02; H04W 92/22; H04B 7/2628; H04J 11/0069

USPC ............. 455/436–439, 442–444, 522, 127.1, 455/13.4; 370/331–335, 318
See application file for complete search history.

(56) References Cited

U.S. PATENT DOCUMENTS

| | | | | |
|---|---|---|---|---|
| 7,443,819 B2 * | 10/2008 | Hempel et al. | ................ | 370/331 |
| 7,920,537 B2 * | 4/2011 | Jones | ............................. | 370/342 |

(Continued)

FOREIGN PATENT DOCUMENTS

| | | | |
|---|---|---|---|
| FR | EP2268079 | * | 12/2010 |
| GB | 2419494 A | | 4/2006 |

(Continued)

OTHER PUBLICATIONS

Heikkila, T. "RAKE Receiver." Postgraduate Course in Radio Communications, Autumn 2004, available online at: http://www.comlab.hut.fi/opetus/333/2004_2005_slides/RAKE_text.pdf.

(Continued)

*Primary Examiner* — Sujatha Sharma
(74) *Attorney, Agent, or Firm* — Murphy, Bilak & Homiller, PLLC

(57) ABSTRACT

The present invention relates to a radio base station (RBS) (1). The RBS comprises a first radio unit (RU) (2) and a second RU (3). The RBS is configured such that said first and second RUs will use the same scrambling or cell identity code for communication with a wireless communication terminal (9) such that the wireless communication terminal will regard the first and second RUs as relating to the same cell of the RBS. The invention also relates to a communication system (13) comprising the RBS, as well as to a use of the RBS for performing an internal handover, after UL measurements, of the communication terminal from the first RU to the second RU, and a method of arranging the RBS.

17 Claims, 5 Drawing Sheets

(56) References Cited

U.S. PATENT DOCUMENTS

| | | | |
|---|---|---|---|
| 8,140,081 B2* | 3/2012 | Barrett et al. | 455/444 |
| 8,504,086 B2* | 8/2013 | So et al. | 455/509 |
| 2002/0090944 A1* | 7/2002 | Shepherd | 455/435 |
| 2007/0249340 A1* | 10/2007 | Hiltunen et al. | 455/433 |
| 2008/0101301 A1* | 5/2008 | Thomas et al. | 370/335 |
| 2009/0073939 A1* | 3/2009 | Panico | 370/335 |
| 2011/0090869 A1* | 4/2011 | Tian et al. | 370/331 |
| 2013/0039281 A1* | 2/2013 | Sarkar et al. | 370/329 |

FOREIGN PATENT DOCUMENTS

| | | |
|---|---|---|
| WO | 99/52226 | 10/1999 |
| WO | WO 02062083 A2 * | 8/2002 |

OTHER PUBLICATIONS

Kottkamp, M. "LTE-Advanced Technology Introduction." White Paper, Rohde & Schwarz, Jul. 2010, available online at: http://www2.rohde-schwarz.com/file_13924/1MA169_2E.pdf.

Author Unknown. "Green Radio—NEC's Approach towards Energy-efficient Radio Access Networks." White Paper, NEC, Feb. 2010, available online at: http://www.nec.com/en/global/solutions/nsp/mwc2010/pdf/greenradio_1.pdf.

Author Unknown. "Mobile Relay for E-UTRA." 3GPP TSG-RAN WG3 #73bis, R3-112597, Zhuhai, China, Oct. 10-14, 2011.

* cited by examiner

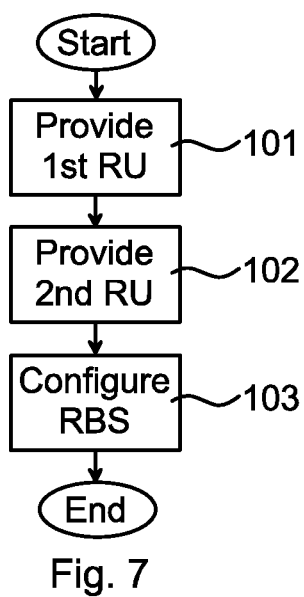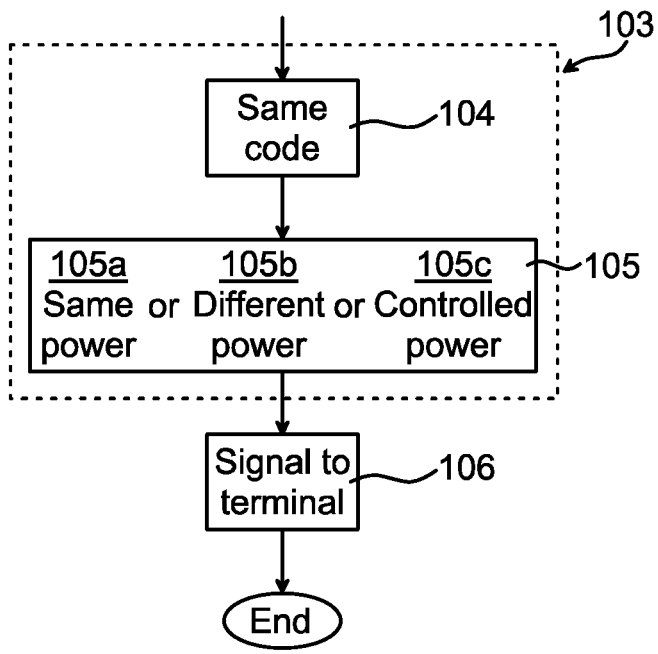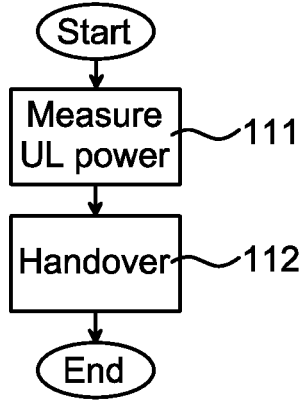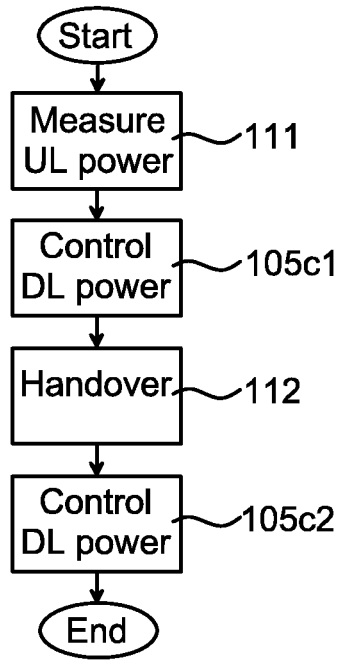
Fig. 7
Fig. 8
Fig. 9
Fig. 10

RADIO BASE STATION AND METHODS THEREOF

TECHNICAL FIELD

The present invention relates to a radio base station (RBS) comprising a plurality of radio units (RUs), as well as to a system comprising an RBS, use of an RBS for performing a handover and a method of arranging an RBS.

BACKGROUND

In cellular radio systems a User Equipment (UE) can move over a geographical area covered by the system. The overall geographical area is covered by many small areas typically denoted sectors. A sector implies the geographical area covered by a radio unit and is typically also the geographical area of a cell. When the user equipment moves from one cell to another the connection between the system and the user equipment must be handed over from the cell where the user equipment is currently camping to the new cell. This is often referred to as a handover.

In existing cellular radio systems such as a Wideband Code Division Multiple Access (WCDMA) radio system a User Equipment (UE) receives a downlink (DL) signal from a first (remote) radio unit ((R)RU) and can perform a so called softer handover to another second Radio unit by simultaneously being connected to both the first and second radio units. All cells are connected to a Radio Network Controller (RNC) via an RBS. The RNC controls all handovers. An exemplary setup illustrating such a scenario is depicted in FIG. 1. FIG. 1 depicts a radio network controller (RNC) connected to a radio base station (RBS). The radio base station comprises a main unit and a number of radio units (RRU A, RRU B and RRU C) connected to the main unit. The different radio units are related to different cells (Cell A, Cell B and Cell C). In this example the radio units are remote radio units deployed at a distance from the main unit at different transmission sites. One or many of the radio units can of course also be co-located with the main unit. The radio units are connected to the RNC via the main unit by cables such as optical cables.

The difference between the distances to the UE from different antennas for the different cells must be less than the narrow search window if the softer handover shall work.

In the set-up being depicted in FIG. 1, every sector is regarded as one cell and every (R)RU has its own scrambling code.

A problem with existing systems is that an increased number of radio units which the RNC need to control may strain the limited resources of the RNC. Also, in areas with many (R)RUs, there is a problem with interference between neighbouring RUs.

SUMMARY

It is an objective of the present invention to at least alleviate a problem of the prior art.

According to an aspect of the present invention, there is provided a radio base station (RBS). The RBS comprises a first radio unit (RU) and a second RU. The RBS is configured such that said first and second RUs will use the same scrambling or cell identity code for communication with a wireless communication terminal such that the wireless communication terminal will regard the first and second RUs as relating to the same cell of the RBS.

According to another aspect of the present invention, there is provided a use of an RBS of the above aspect. The use is for performing an RBS internal handover of the wireless communication terminal from said first RU to said second RU. The handover is performed based on uplink transmission power received by the first and second RUs, respectively, from the wireless communication terminal.

According to another aspect of the present invention, there is provided a radio communication system comprising the RBS of the above aspect and the wireless communication terminal.

According to another aspect of the present invention, there is provided a method of arranging a radio base station (RBS). The method comprises providing a first radio unit (RU) of the RBS and providing a second RU of the RBS. The method further comprises configuring the RBS such that the first and second RUs can be regarded by a wireless communication terminal as relating to the same cell of the RBS by setting said first and second RUs to use the same scrambling or cell identity code for communication with such a wireless communication terminal.

The method aspect of the present invention may be used for arranging an RBS according to the RBS aspect of the present invention.

According to another aspect of the present invention, there is provided a computer program product. The computer program product comprises computer-executable components for the configuring of the RBS according to the method aspect above or for performing the use aspect above when the computer-executable components are run on a processing unit comprised in the RBS.

It is an advantage of the present invention according to the aspects above that since the first and second RUs use the same code, providing a single cell, fewer cells in a communication system may need to be administered by the communication system, e.g. by an RNC. It is another advantage of the present invention according to the above RBS device aspect that the communication terminal regards the first and second RUs as relating to the same cell and may thus e.g. move within the cell without having to administer any handover between the first and second RUs. Instead, the RBS may, according to some embodiments of the present invention, administer any handover between the first and second RUs without any handover specific signalling between the communication terminal and the RBS. Thus, it is an advantage of the present invention that the RBS may be used for preforming an RBS internal handover based on uplink (UL) transmission power, instead of on downlink (DL) transmission power. The handover may consequently be handled by the RBS without involving the communication terminal, reducing the strain put on the communication terminal and on signalling recourses between the communication terminal and the RBS.

The discussions above and below in respect of any of the aspects of the invention is also in applicable parts relevant to any other aspect of the present invention.

Below, some more specific embodiments of the present invention are briefly presented.

The RBS may comprise an RBS internal handover module configured to facilitate a handover of said wireless communication terminal from said first RU to said second RU based on uplink transmission power received by the first and second RUs, respectively, from the wireless communication terminal.

The RBS may comprise a main unit, at least one of the first and second RUs being a remote RU in respect of said main unit. The main unit may e.g. comprise functionality for administering the RUs, functionality which may then be centrally placed in the main unit instead of being placed in each of the RUs. Thus, the cell to which the RUs relate may cover a larger area and/or be more adapted to the geography where it is located.

The RBS may be configured such that both of the first and second RUs will use the same transmission power when the RBS sends signals to the wireless communication terminal. This allows for a simple set up of the RBS where both the first and the second RU may transmit with the same DL transmission power, regardless of where the communication terminal is located and of whether the communication terminal can receive signals from both or only one of the RUs. The DL transmission power may e.g. be regulated in view of the UL transmission power received by the RBS from the communication terminal.

The RBS may be configured such that the first RU will use a different transmission power than the transmission power used by the second RU when the RBS sends signals to the wireless communication terminal. Thus, the transmission power of the respective RUs may be set e.g. in view of the different environments where the RUs are positioned. The second RU may e.g. cover a smaller sector embedded in a larger sector covered by the first RU, e.g. if the embedded sector is in radio shadow of the larger sector or if extra coverage is needed for some other reason. The respective transmission powers of the RUs may still be regulated together with each other, e.g. the transmission power of the second RU may be a percentage of the transmission power of the first RU or the transmission power of the second RU may be a certain amount of power higher or lower than the transmission power of the first RU. This allows for a simple set up of the RBS where both the first and the second RU may transmit with certain DL transmission power, regardless of where the communication terminal is located and of whether the communication terminal can receive signals from both or only one of the RUs. The DL transmission power may e.g. be regulated in view of the UL transmission power received by the RBS from the communication terminal.

The RBS may comprise a power control module configured to facilitate control of downlink transmission power of the first and second RUs independently of each other, based on uplink transmission power received by said first and second RUs, respectively, from the wireless communication terminal. This allows the respective transmission powers of the RUs to be controlled/regulated independently. The power control module may be configured to facilitate control of any of the RUs to transmit at a reduced power or with no power if the uplink transmission power received by said any of the first and second RUs is below a pre-set threshold, possibly in relation to the uplink transmission power received by the other RU. Thus, energy consumption and/or radio interference may be reduced since the respective transmission powers of the RUs may be individually controlled/adjusted depending on the transmission power needed for each of the RUs to reach the communication terminal. If the communication terminal is close to an RU, that RU may transmit with a lower power than an RU further away from the communication terminal. If the communication terminal is too far away from an RU for communication with that RU, said RU may use a low or no transmission power.

The RBS may be configured such that all the RUs of the RBS will use the same scrambling or cell identity code for communication with the wireless communication terminal, such that the wireless communication terminal will regard said all RUs as relating to the same cell of the RBS. If all the RUs of an RBS relate to the same cell, the administration of the RBS may be simplified.

The RBS may be configured in accordance with any suitable communication standard, such as a Wideband Code Division Multiple Access, W-CDMA, or Long Term Evolution, LTE, communication standard.

The RBS may comprise a narrow search window module configured for admitting uplink transmission power received by any of the RUs within a narrow search window from the wireless communication terminal. The RBS may comprise a wide area search module configured to detect uplink transmission power from the wireless communication terminal received outside of the narrow search window by any of the RUs, and configured to, if a, possibly, higher uplink transmission power from the wireless communication terminal is detected outside of the narrow search window than inside said narrow search window, move the narrow search window to admit said higher uplink transmission power or increase the narrow search window or add new narrow search window(s), in order to increase uplink transmission power. Thus, the RBS may locate the communication terminal within the cell and may e.g. adjust the transmission power(s) of the RUs accordingly as discussed above.

The RBS may e.g. be used to perform an RBS internal handover by measuring the received uplink transmission power of the first and second RUs, respectively, over time; and performing a handover from the first RU to the second RU when a pre-defined criterion based on said measuring of the received uplink transmission powers over time is fulfilled. That the measurement is performed over time implies that measurements are performed at different points in time to detect changes in received uplink transmission power from one point in time to another point in time. The measurements may e.g. be continuous or periodic or when needed/desired.

The radio communication system may comprise a radio network controller (RNC), said RNC regarding the first and second RUs as relating to the same cell of the RBS. The strain put on the RNC may thus be reduced since the number of cells to control are reduced.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which:

FIG. 7 is a schematic flow chart of an embodiment of a method of the present invention.

FIG. 8 is a schematic flow chart of a part of another embodiment of a method of the present invention.

FIG. 9 is a schematic flow chart of an embodiment of a use of an RBS, according to the present invention.

FIG. 10 is a schematic flow chart of another embodiment of a use of an RBS, according to the present invention.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The communication terminal may be any suitable wireless communication terminal or user equipment (UE), such as a mobile phone or a portable computer. Below, reference is often made to a UE. However, this should not limit the present invention to any specific communication standard. Rather, the terms UE and communication terminal may be regarded as essentially synonymous, unless conflicting with the context.

The RBS may be any suitable radio base station, according to any suitable communication standard, such as a Node B or an eNode B.

In the present disclosure, the terms "code", "scrambling code" and "cell identity code" are used essentially interchangeably. The respective terms are used often in different standards. However, herein the terms are not intended to limit the invention to a specific communication standard. Wherever one of the terms is used, it may be read as "scrambling or cell identity code", unless such reading is in direct conflict with the context.

In the present disclosure, the term "sector" is intended to denote a geographical area covered by a radio unit. In the present disclosure, the term "cell" is intended to denote a radio area/radio areas having the same code (scrambling code or cell identity code). In the present disclosure, the term "cell portion" or "radio area" is intended to denote the part of a cell covered by one radio unit (RU), e.g. a remote radio unit (RRU).

In the present disclosure, the term "RBS internal handover" is intended to denote a handover between different radio units (RUs) or cell portions which are part of the same radio base station (RBS). According to the present invention, these RUs or cell portions may be part of the same cell (having the same code), whereby the communication terminal being subject to the handover may not need to be aware of said handover.

Figure 1:
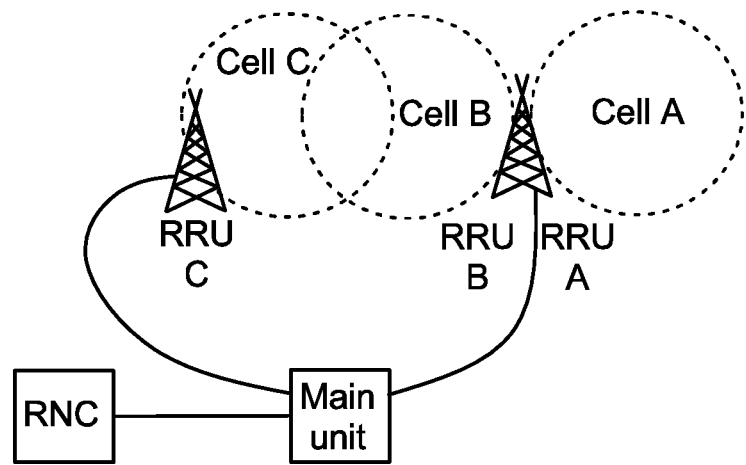
FIG. 1 illustrates a prior art base station with remote radio units (RRU).
Figure 2:
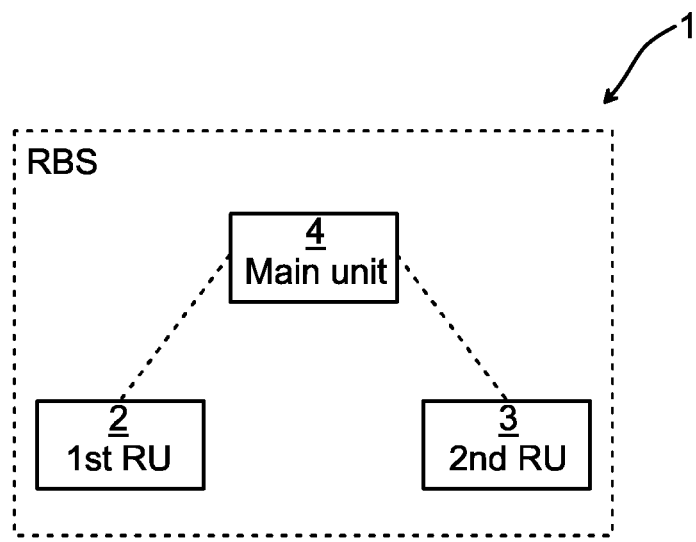
FIG. 2 is a schematic illustration of an embodiment of a radio base station (RBS) of the present invention.

With reference to FIG. 2, an embodiment of an RBS 1 according to the present invention will now be discussed. The RBS 1 comprises a first RU 2 and a second RU 3.

These RUs may be connected to and controlled/handled/administered by a main unit 4 of the RBS 1, as indicated by the dashed lines between the main unit 4 and each of the RUs 2 and 3. One or both of the RUs 2 and 3 may typically be remote. Thus the first RU 2 and/or the second RU 3 may be a remote radio unit (RRU), thus not co-located with the main unit 4. The RUs 2 and 3 form a single cell since they use the same code (e.g. scrambling code or cell identity code) and are seen as a single cell, such as produced by a single RU, by a communication terminal. When the RBS 1 communicates with a communication terminal, both the first and second RUs 2 and 3 may receive transmissions from the communication terminal if they are both in range of the communication terminal. The main unit 4 may receive the signals from the communication terminal via both the RUs 2 and 3 and combine these signals to increase the signal-to-noise ratio.

Figure 3:
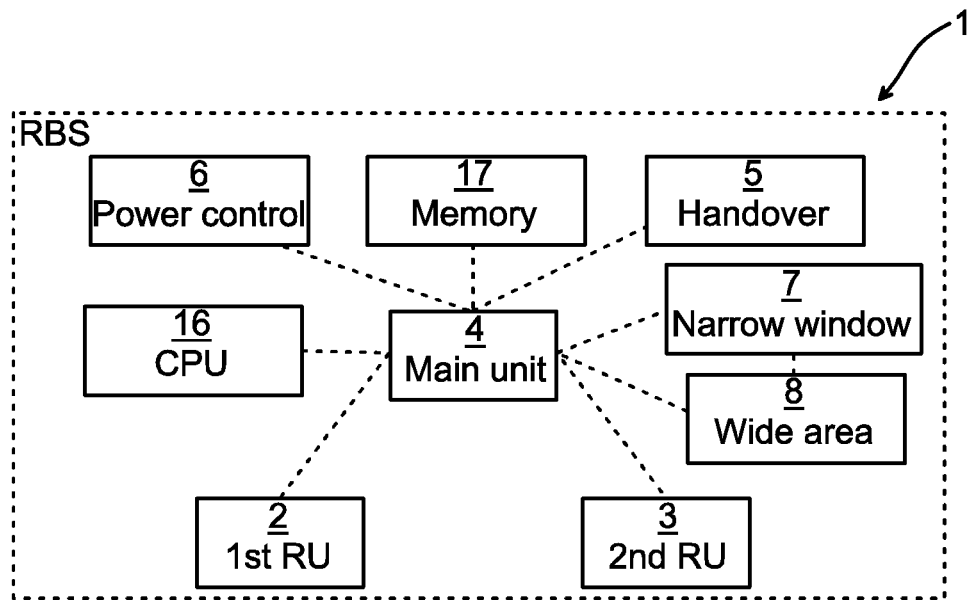
FIG. 3 is a schematic illustration of another embodiment of an RBS of the present invention.

FIG. 3 discloses another embodiment of an RBS 1 according to the invention. The RBS 1 comprises a main unit 4 and first and second RUs 2 and 3 as discussed in respect of FIG. 2 above. The RBS 1 may, as in accordance with the embodiment of FIG. 3, comprise additional optional units/functions/modules for giving functionality to the RBS 1. Each of these optional units/functions/modules may be present or absent in an RBS 1 of the present invention, independently of any other optional units/functions/modules. Each of said optional units/functions/modules may be separate from the main unit 4 or comprised in the main unit 4, independently of any other optional units/functions/modules. Some of these optional units/functions/modules are discussed in the following.

Thus, the RBS 1 may comprise an RBS internal handover module 5. The handover module 5 may facilitate handover from one of the RUs 2 and 3 to another of the RUs 2 and 3. Since both the RUs 2 and 3 are part of the same RBS 1, the handover is called an RBS internal handover. It should be noted that the RBS 1 may comprise additional RU(s) (not shown in FIG. 3) which may also be related to the same cell as the RUs 2 and 3, why RBS internal handover may also be performed with participation by any such additional RU(s). The RBS internal handover may by means of the handover module 5 perform an internal handover of a communication terminal connected to the RBS 1 without the communication terminal participating actively in the handover, or even being aware that a handover is taking place. The handover may e.g. be from the first RU 2 to the second RU 3. The handover module 5 may make the decision to handover the communication terminal. The decision may be based on the respective received UL transmission power received by each of the RUs 2 and 3 from the communication terminal. If e.g. the communication terminal is connected to the first RU 2, the handover module 5 may decide to handover the communication terminal to the second RU 3 if e.g. the transmission power, from the communication terminal, received by the second RU 3 is higher than the transmission power received by the first RU 2, possibly by a specified margin, or if the transmission power received by the second RU 3 is above a predetermined threshold and/or if the transmission power received by the first RU 2 is below a predetermined threshold.

Further, the RBS 1 may comprise a power control module 6. The power control unit 6 is configured for control of DL transmission power of the first and second RUs 2 and 3, and any other RU(s) of the same cell, independently of each other. Also the transmission power control may be based on the respective UL transmission power received by the different RUs 2 and 3 from the communication terminal. If e.g. the received UL transmission power is higher for the first RU 2 than for the second RU 3, less energy may be used for DL transmission from the first RU 2 than from the second RU 3, such as by reducing the DL transmission power of the first RU 2, in order to reach the communication terminal, whereby energy may be saved. Additionally or alternatively, the DL transmission power of the second RU 3 may be reduced, or the DL transmission may be stopped altogether, if the UL transmission power received by the second RU 3 is below a predetermined threshold, or no UL transmission power is detected at all due to the communication terminal being out of range, if it is determined e.g. that the second RU 3 is out of range for the communication terminal or that the DL transmission from the first RU 2 is enough for sufficiently good communication with the communication terminal. In this way, the power control module 6 may make the RBS more flexible and allow reduced power consumption.

Further, the RBS 1 may comprise a narrow search window module 7. The narrow search window module 7 may be configured, or may configure the RBS 1, for admitting uplink transmission power received by any of the RUs 2 and 3 within a narrow search window from a wireless communication terminal. The narrow search window may be regarded as a time window in which the strongest UL transmission(s) from the communication terminal is received by the RUs 2 and 3. The position of the narrow search window may typically correspond to a geographical position of the communication terminal in respect of the RBS 1. The same narrow search window may be used for all the RUs 2 and 3, i.e. there may be no RU specific narrow search window. Thus, the communication terminal may typically be positioned approximately the same distance from each of the RUs 2 and 3 in order for UL signals to be received within the narrow search window of both the RUs 2 and 3 to facilitate e.g. handover between the RUs 2 and 3. By using a narrow search window, the signal-to-noise ratio may be improved since any signals received outside of the narrow search window may be disregarded as noise. The RBS 1 may also comprise a wide area search module 8. The wide area search module 8 may be configured, or may configure the RBS 1, for detecting uplink transmission power from the wireless communication terminal received outside of the narrow search window by any of the RUs 2 and 3, and for, if a, possibly higher, uplink transmission power from the wireless communication terminal is detected outside of the narrow search window than inside said narrow search window, e.g. moving the narrow search window, increasing the narrow search window or adding narrow search window (s) to admit said outside uplink transmission power. By means of the wide area search module 8, the narrow search window may thus be optimised and the communication terminal may be found. The narrow search window and the wide area search module 8 (also called wide area searcher) is further discussed later in this disclosure.

Further, the RBS 1 may comprise a processing unit 16, such as a central processing unit (CPU). However, other suitable devices with computing capabilities could be used, e.g. an application specific integrated circuit (ASIC), a field programmable gate array (FPGA), a complex programmable logic device (CPLD), etc. As mentioned above, the processing unit 16 may be included in the main unit 4. The processing unit may provide processing functionality to e.g. the main unit 4 and/or any other unit of the RBS 1, such as the handover unit 5, the power control unit 6, the narrow search window unit 7 and/or the wide area search unit 8. The processing unit 16 may be used for executing software/computer program for running the RBS 1.

Further, the RBS may comprise a storage unit or memory 17. The storage unit 17 may e.g. by used for storing a computer program/software which may be executed by the processing unit 16 and/or for storing the thresholds discussed above in relation to any of the handover unit 5 and the power control unit 6.

Figure 4:
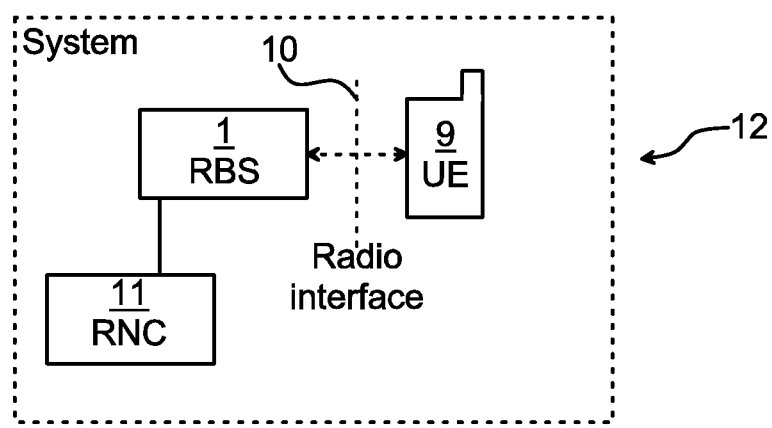
FIG. 4 is a schematic illustration of an embodiment of a radio communication system of the present invention.

FIG. 4 illustrates an embodiment of a communication system 12 comprising an RBS 1 such as a RBS 1 as discussed in respect of FIG. 2 or 3. In addition to the RBS 1, the system 12 comprises a communication terminal or UE 9, connected to or in communication with the RBS 1 over a radio interface 10. The communication system 12 may e.g. be in accordance with a W-CDMA or LTE standard. If the communication system 12 is in accordance with a W-CDMA standard, the communication system 12 may comprise an RNC 11 connected to the RBS 1.

Figure 5:
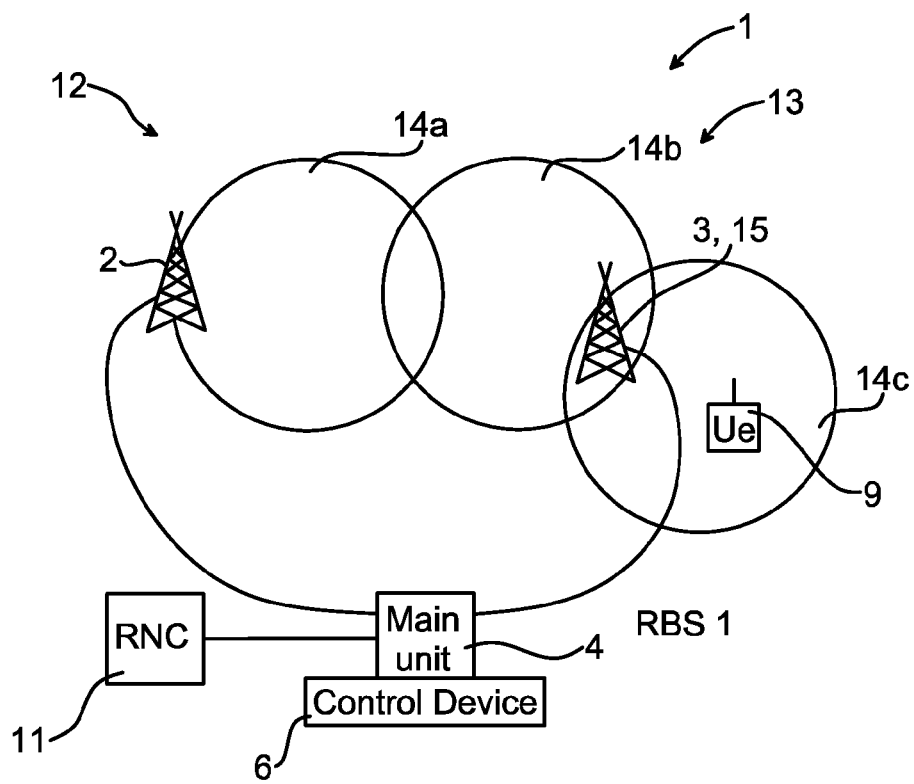
FIG. 5 is a schematic illustration of another embodiment of a radio communication system of the present invention.

In accordance with an embodiment, a radio base station 1 in a WCDMA system 12 comprises a main unit 4 connected to a number of radio units 2, 3 and 15 (see FIG. 5). The radio unit(s) provides a connection to a user equipment 9 located within an area 14 (see FIG. 5 or 6) covered by the radio unit(s) over an air interface 10. Each radio unit is associated with a scrambling code. The radio base station 1 is configured to form a cluster of sectors 14 by assigning the same scrambling code to a set of radio units. Hereby, the number of radio units that need to be connected to and controlled by the RNC 11 is reduced. For WCDMA this means that the RNC will handle the cluster as one cell.

In accordance with an embodiment, one, a plurality or all of the radio units 2, 3 and 15 of the RBS 1 may be remote radio unit(s). In accordance with an embodiment, all radio units of a radio base station is assigned the same scrambling code.

In accordance with an embodiment, all radio units 2, 3 and 15 are controlled to transmit with the same transmit power. This is further illustrated in FIG. 5. In such an embodiment all radio units will transmit with the same power level even if the user equipment 9 is only connected to one radio unit.

FIG. 5 illustrates an embodiment of a communication system 12 of the present invention. The system 12 comprises a main unit 4 and three RRUs 2, 3 and 15, where the RRUs 3 and 15 are co-located on the same radio mast or similar. Each of the RRUs covers a sector or radio area 14; RRU 2 covers radio area 14a, RRU 3 covers radio area 14b and RRU 15 covers radio area 14c. All the radio areas 14a-c are depicted of equal size in FIG. 5 in order to illustrate that all the RRUs 2, 3 and 15 transmit to the communication terminal 9 with the same transmission power, even though only the RRU 15 appears to be in range of the communication terminal 9. This is a simple way to set up the system. Since all the RRUs 2, 3 and 15 use the same code, the radio areas 14a-c all form a single cell 13 as viewed by the communication terminal 9 and/or the RNC 11. The RNC 11 is connected to the main unit 4. Also a power control unit/control device 6 (discussed above) is connected to the main unit 4.

Figure 6:
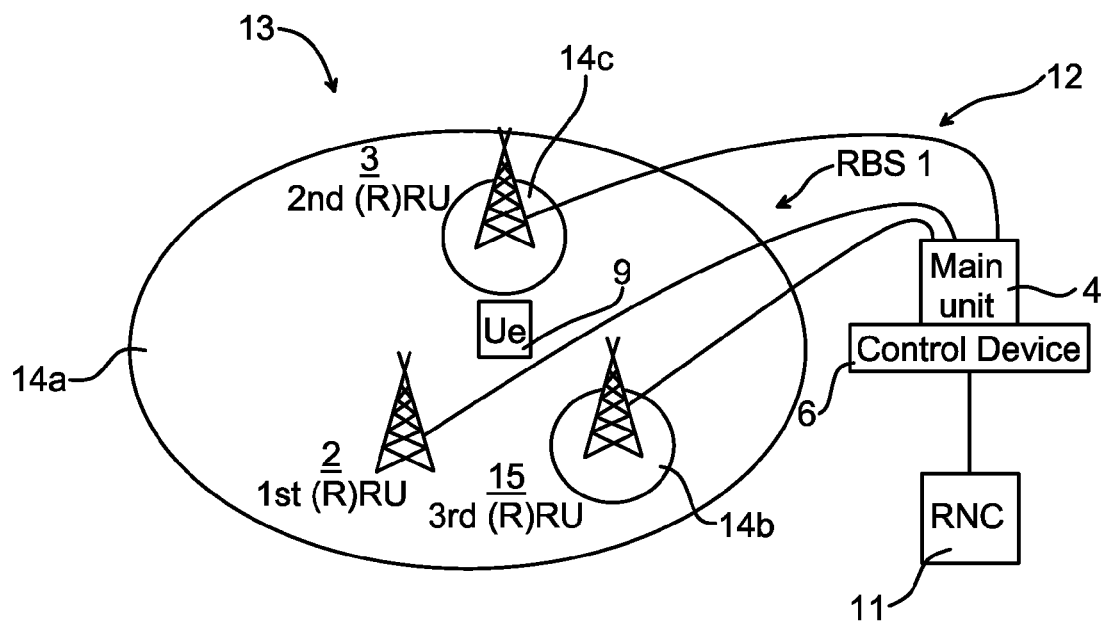
FIG. 6 is a schematic illustration of another embodiment of a radio communication system of the present invention.

FIG. 6 illustrates another embodiment of a communication system 12 of the present invention. The system 12 comprises a main unit 4, an RNC 11 and a control device 6, as in the embodiment of FIG. 5, and three RRUs 2, 3 and 15. However, in the embodiment of FIG. 6, the radio areas 14b and 14c are embedded in the larger radio area 14a. The RUs 3 and 15 may e.g. be arranged to cover volumes within the radio area 14a of the RU 2 where the radio reception is bad, where it is radio shadow. Thus, the communication terminal 9 may have sufficient connection to the cell 13 of the RBS 1 even when entering such a volume of bad reception.

In accordance with an embodiment, an embedded cell is provided by assigning different power to different radio units 2, 3 and 15 but assigning the same scrambling or cell identity code to a set of or all radio units under control by the radio base station 1. This is further illustrated in FIG. 6.

In order to save energy, the radio units 2, 3 or 15 not receiving uplink energy above a threshold value can be controlled to transmit at a reduced power level or with no power.

The UE 9 is then only connected to the radio units 2, 3 or 15 which have enough UL power. The radio units that are connected to the UE can be controlled to send with different power.

Independent of how the radio base station 1 assigns power to the different radio units 2, 3 and 15 in accordance with the above, the UE 9 can be in the same narrow search window when moving from one Radio area 14 covered by one radio unit 2, 3 or 15 to another.

In accordance with an embodiment, the narrow search window can be moved when the UE 9 moves. The narrow search window can be set to a location where the majority of the power is situated. For a rake receiver the power can be measured for the rake fingers and the narrow search window can be positioned where the power of the rake fingers is maximized.

In accordance with an embodiment, a wide area searcher 8 is used to find power outside the narrow search window and move the narrow search window to where the majority of the power is situated, or the window size may be increased to include the power outside, or add new additional window(s) to cover the power outside. The wide area searcher may be configured to periodically search for the power maximum.

By configuring the radio units 2, 3 and 15 in accordance with the above, a UE 9 may experience that all sectors 14 having the same scrambling or cell identity code belong to one cell/cell carrier. As a result a UE will not do soft/softer handover when moving between the sectors, and will not send any indications for the active cells for these sectors, since all sectors will have the same scrambling code.

When all the radio units 2, 3 and 15 are transmitting, the lack of information about the active cells may result in that the RBS 1 will transmit the downlink (DL) signal in all sectors 14.

With reference to FIG. 7, an embodiment of a method of arranging a radio base station 1 of the present invention will now be discussed. In a step 101, a first RU 2 of the RBS 1 is provided. The RU 2 may e.g. be mounted in place as a remote RU 2 in respect to a main unit 4 of the RBS 1. In a step 102, a second RU 3 of the RBS 1 is provided. The RU 3 may e.g. be mounted in place as a remote RU 3 in respect to the main unit 4 of the RBS 1. In a step 103, the RBS 1 is configured or set up for active use. The RBS 1 may be configured 103 such that the first and second RUs 2 and 3 can be regarded by a wireless communication terminal 9 as relating to the same cell 13 of the RBS 1 by setting said first and second RUs to use the same scrambling or cell identity code for communication with such a wireless communication terminal 9.

FIG. 8 illustrates embodiments of the configuring 103 of the RBS 1. In a step 104, the same code is assigned to both of the radio units 2 and 3, thereby making them part of the same cell 13. In a step 105, a transmission power scheme is assigned to the RUs 2 and 3. Three different alternative steps 105 are shown, 105a, 105b and 105c. According to the alternative 105a, the RBS 1 is configured 103 such that the first RU 2 always transmits with the same DL transmission power as the second RU 3, and vice versa, cf. FIG. 5. This is a simple but less flexible way to configure 103 the RBS 1. According to the alternative 105b, the RBS 1 is configured 103 such that the first RU 2 always transmits with a different DL transmission power than the second RU 3, and vice versa, cf. FIG. 6 with embedded radio areas. According to the alternative 105c, the transmission power of the respective RUs 2 and 3 are individually controlled, e.g. by means of a power control unit 6 as discussed above. After the RBS 1 has been configured 103, it is ready for active use to communicate with/signal 106 a communication terminal 9.

FIG. 9 illustrates an embodiment of a use of an RBS 1 for performing an RBS internal handover 112 of a wireless communication terminal 9 from the first RU 2 to the second RU 3. The performing of the handover 112 may be based on uplink transmission power received 111 by the first and second RUs 2 and 3, respectively, from the wireless communication terminal 9. The use of FIG. 9 comprises measuring (step 111) the received uplink transmission power of the first and second RUs 2 and 3, respectively, over time. The use of FIG. 9 further comprises performing a handover (step 112) from the first RU 2 to the second RU 3 when a pre-defined criterion, or several predefined criteria, based on said measuring 111 of the received uplink transmission powers over time is/are fulfilled. As discussed above in respect of the RBS internal handover module 5, this criterion may e.g. be that the transmission power, from the communication terminal 9, received by the second RU 3 is higher than the transmission power received by the first RU 2, possibly by a specified margin, or that the transmission power received by the second RU 3 is above a predetermined threshold and/or that the transmission power received by the first RU 2 is below a predetermined threshold.

FIG. 10 illustrates another embodiment of a use of an RBS 1 for performing an RBS internal handover 112 of a wireless communication terminal 9 from the first RU 2 to the second RU 3. In this embodiment, the RBS 1 is configured 103 according to the alternative 105c with controlled power. The received uplink transmission power of the first and second RUs 2 and 3, respectively, are measured 111 as in FIG. 9. Based on this measurement 111, the transmission power of the RUs 2 and 3 may be individually adjusted/controlled (step 105c1) as discussed above in respect of the power control unit 6. Additionally, the measurement 111 may form basis for an RBS internal handover 112 as in FIG. 9. After the handover 112, the transmission power of the RUs 2 and 3 may be individually adjusted/controlled (step 105c2) as discussed above in respect of the power control unit 6 since it may be desirable to have different transmission powers when the communication terminal 9 is connected to the second RU 3 than when it was connected to the first RU 2.

Figure 11:
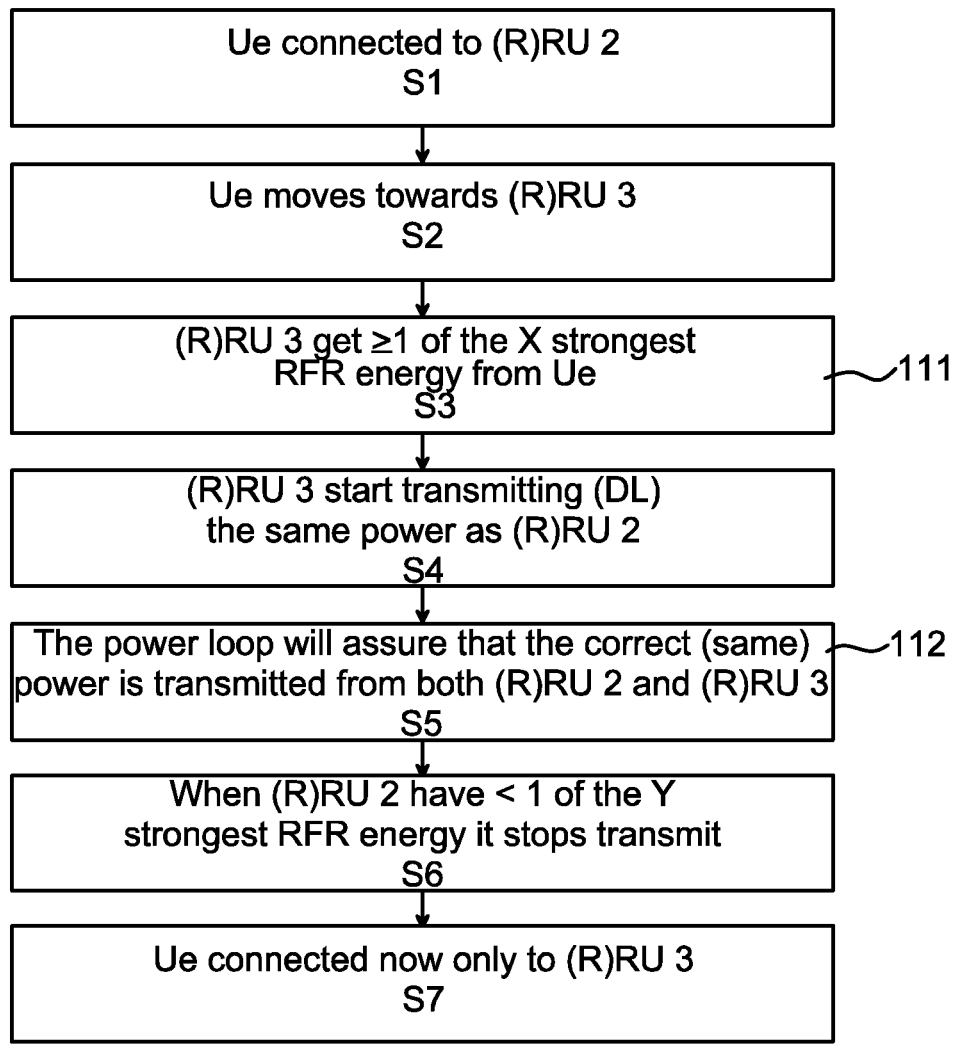
FIG. 11 is a schematic flow chart of another embodiment of a use of an RBS, according to the present invention.
Figure 12:
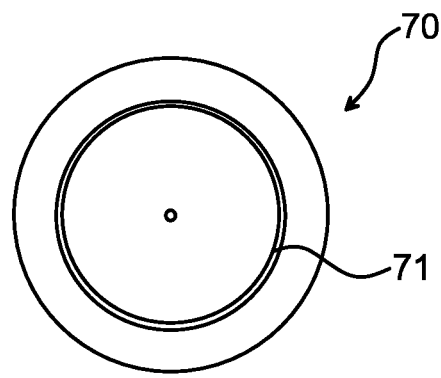
FIG. 12 is a schematic illustration of an embodiment of a computer program product of the present invention.

FIG. 11 illustrates an embodiment of a handover method when using individually controlled transmission power (step 105c) in which only RUs in range of the communication terminal 9 transmit. When not all the radio units 2 and 3 are transmitting; information about the active cells will be seen from the Uplink (UL) measurements 111. The radio base station 1 will then transmit 106 the DL signal in the sectors 14 that have enough UL power above a threshold value. The handover 112 in such a configuration can be performed as shown in FIG. 11. In accordance with the flowchart, the UE 9 is initially in a first step S1 connected to a first radio unit 2 or remote radio unit 2. Next, in a step S2 the UE 9 moves towards an area 14 covered by a second radio unit 3. Then in a step S3 (corresponding at least in part to measurement step 111 discussed above), if the second radio unit 3 receives one (or a number above a threshold) or more of the X (X being a positive integer) strongest rake finger energies from the UE 9, the second radio unit 3 starts transmitting 106 in the downlink in a step S4. The power may be the same as the power that the first radio unit 2 currently transmits 106. This can be assured by the power loop in a step S5. In this step S5, when both RUs 2 and 3 transmit to, and are thus connected to, the communication terminal 9, the handover 112 may be regarded as taking place. Next in a step S6, when the first radio unit 2 no longer receives any (or a number below a threshold) of the Y strongest (Y being a positive integer, in particular X=Y), transmissions from the first radio unit 2 is stopped. The result is then that the UE 9 is only connected to the second radio unit 3 in a step S7.

As described above, if information is provided concerning from which Radio unit(s) 2, 3 uplink energy comes from, DL energy can be assigned to only those antennas (RUs) that receive energy. If, at the same time, the wide area searcher 8 searches periodically over a larger area, uplink energy could be found from other paths.

All uplink thresholds and timing between Radio areas 14 may be set to the corresponding values as in softer handover but in Uplink. The downlink control channel power in DL can further be scaled to the coverage area 14 of every Radio unit. RBS internal handover 112 may be performed with information of the power in the Uplink in the different Radio units, in contrast to softer hand over that is initiated on the downlink. The uplink thresholds may be scaled the same way as the downlink control channels. Below an exemplary set up of different sectors 14 is shown (cf. FIGS. 5 and 6):

Conventional Setup

Sector 14*a*=(R)RU 2: CPICH 1, Output pwr 1, Scrambling code 1 etc
Sector 14*b*=(R)RU 3: CPICH 2, Output pwr 2, Scrambling code 2 etc
Sector 14*c*=(R)RU 15: CPICH 3, Output pwr 3, Scrambling code 3 etc
and so on Embodiment 1

New Setup with Same Power in all Radio Units

Sector 14*a*=(R)RU 2 Master cell: CPICH 1, Output pwr 1, Scrambling code 1 etc
Sector 14*b*=(R)RU 3 Slave cell: CPICH 1, Output pwr 1, Scrambling code 1 etc
Sector 14*c*=(R)RU 15 Slave cell: CPICH 1, Output pwr 1, Scrambling code 1 etc
and so on Embodiment 2

New Setup with Different Power in Different Radio Units

Sector 14*a*=(R)RU 2 Master cell: CPICH 1, Output pwr 1, Scrambling code 1 etc
Sector 14*b*=(R)RU 3 Slave cell: CPICH 2, Output pwr 2, Scrambling code 1 etc
Sector 14*c*=(R)RU 15 Slave cell: CPICH 3, Output pwr 3, Scrambling code 1 etc
and so on The radio base station 1 may base decisions on measurements 111 on UL Dedicated Physical Control Channel (DPCCH) channel. The control channel power in DL can be scaled to the coverage area 14 of every Radio unit 2, 3 and 15. The uplink threshold used for cell selection can be scaled in the same way as the downlink control channels.

An embodiment of a computer readable medium or computer program product 70 of the present invention is illustrated in FIG. 11. The computer program product 70 comprises computer-executable components 71 for the configuring 103 of the RBS 1 according to the method of arranging a radio base station discussed above or for performing the use of an RBS 1 for performing an RBS internal handover 112 when the computer-executable components 71 are run on a processing unit 16 comprised in the RBS 1. The computer readable medium or computer program product 70 may e.g. be a RAM, a Flash memory or a hard disk, and may be movable, such as an external hard drive or USB stick, or stationary, e.g. comprised in the storage unit 17. The processing unit 16 may thus execute appropriate software 71 stored in associated memory storage 17 or 70 for procuring required functionality in the RBS 1.

The invention also extends to a control device 6 arranged to perform transmission control in a radio base station 1 as described above. The control device can be implemented in the main unit of the radio base station by a controller/controller circuitry for performing the above methods and uses. The controller(s) can be implemented using suitable hardware and or software. The hardware can comprise one or many processors 16 that can be arranged to execute software stored in a readable storage media 17 or 70. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A radio base station (RBS), comprising:
a first radio unit (RU); and
a second RU;
the RBS being configured such that said first and second RUs will use the same scrambling or cell identity code for communication with a wireless communication terminal such that the wireless communication terminal will regard the first and second RUs as relating to the same cell of the RBS;
the RBS further comprising an RBS internal handover circuit configured to facilitate a handover of the wireless communication terminal from the first RU to the second RU based on uplink transmission power received by the first and second RUs from the wireless communication terminal; and
the RBS further comprising a power control module configured to facilitate control of downlink transmission power of the first and second RUs independently of each other, based on uplink transmission power received by said first and second RUs, respectively, from the wireless communication terminal, wherein the power control module is configured to facilitate control of any of the RUs to transmit at a reduced power or with no power if the uplink transmission power received by said any of the first and second RUs is below a pre-set threshold relative to the other RU.

2. The RBS of claim 1, further comprising a main unit, at least one of the first and second RUs being a remote RU in respect of said main unit.

3. The RBS of claim 1, wherein the RBS is configured such that both of the first and second RUs will use the same transmission power when the RBS sends signals to the wireless communication terminal.

4. The RBS of claim 1, wherein said RBS is configured such that the first RU will use a different transmission power than the transmission power used by the second RU when the RBS sends signals to the wireless communication terminal.

5. The RBS of claim 1, wherein the RBS is configured such that all the RUs of the RBS will use the same scrambling or cell identity code for communication with the wireless communication terminal, such that the wireless communication terminal will regard said all RUs as relating to the same cell of the RBS.

6. The RBS of claim 1, wherein the RBS is configured in accordance with a Wideband Code Division Multiple Access (W-CDMA) or Long Term Evolution (LTE) communication standard.

7. The RBS of claim 1, further comprising:
a narrow search window module configured to admit uplink transmission power received by any of the RUs within a narrow search window from the wireless communication terminal; and
a wide area search module configured to detect uplink transmission power from the wireless communication terminal received outside of the narrow search window by any of the RUs, and configured to, if uplink transmission power from the wireless communication terminal is detected outside of the narrow search window, either move the narrow search window or increase the narrow search window or add new narrow search windows, in order to increase the received uplink transmission power.

8. A method in a radio base station (RBS) that comprises a first radio unit (RU) and a second RU, the method comprising:
using the same scrambling or cell identity code in the first and second RUs for communication with a wireless communication terminal such that the wireless communication terminal will regard the first and second RUs as relating to the same cell of the RBS;
performing an RBS internal handover of said wireless communication terminal from said first RU to said second RU based on uplink transmission power received by the first and second RUs, respectively, from the wireless communication terminal;
controlling downlink transmission power of the first and second RUs independently of each other, based on uplink transmission power received by said first and second RUs, respectively, from the wireless communication terminal; and
controlling of any of the first and second RUs to transmit at a reduced power or with no power if the uplink transmission power received by said any of the first and second RUs is below a pre-set threshold relative to the other RU.

9. The method of claim 8, wherein said performing an RBS internal handover of said wireless communication terminal comprises:
measuring the received uplink transmission power of the first and second RUs, respectively, over time; and
performing a handover from the first RU to the second RU when a pre-defined criterion based on said measuring of the received uplink transmission powers over time is fulfilled.

10. A radio communication system comprising:
a wireless communication terminal; and
a radio base station (RBS), the RBS in turn comprising a first radio unit (RU), a second RU, and an RBS internal handover circuit, the RBS being configured such that said first and second RUs will use the same scrambling or cell identity code for communication with the wireless communication terminal such that the wireless communication terminal will regard the first and second RUs as relating to the same cell of the RBS, and the RBS internal handover circuit being configured to facilitate a handover of the wireless communication terminal from the first RU to the second RU based on uplink transmission power received by the first and second RUs from the wireless communication terminal;
the RBS further comprising a power control module configured to facilitate control of downlink transmission power of the first and second RUs independently of each other, based on uplink transmission power received by said first and second RUs, respectively, from the wireless communication terminal, wherein the power control module is configured to facilitate control of any of the first and second RUs to transmit at a reduced power or with no power if the uplink transmission power received by said any of the first and second RUs is below a pre-set threshold relative to the other RU.

11. The radio communication system of claim 10, further comprising a radio network controller (RNC), said RNC regarding the first and second RUs as relating to the same cell of the RBS.

12. A method of arranging a radio base station (RBS), the method comprising:
providing a first radio unit (RU) of the RBS;
providing a second RU of the RBS;
providing an RBS internal handover module;
configuring the RBS such that the first and second RUs can be regarded by a wireless communication terminal as relating to the same cell of the RBS by setting said first and second RUs to use the same scrambling or cell identity code for communication with such a wireless communication terminal and configuring the RBS internal handover module to facilitate a handover of a wireless communication terminal from the first RU to the second RU based on uplink transmission power received by the first and second RUs from the wireless communication terminal; and
configuring a power control module in the RBS to facilitate control of downlink transmission power of the first and second RUs independently of each other, based on uplink transmission power received by said first and second RUs, respectively, from the wireless communication terminal, and to facilitate control of any of the first and second RUs to transmit at a reduced power or with no power if the uplink transmission power received by said any of the first and second RUs is below a pre-set threshold relative to the other RU.

13. The method of claim 12, further comprising configuring the RBS such that the first and second RUs will both use the same transmission power when the RBS sends signals to the wireless communication terminal.

14. The method of claim 12, further comprising configuring the RBS such that the first RU will use a different transmission power than the transmission power used by the second RU when the RBS sends signals to the wireless communication terminal.

15. The method of claim 12, further comprising configuring the RBS such that downlink transmission power of the first and second RUs can be controlled independently of each other, based on uplink transmission power received by said first and second RUs, respectively, from the wireless communication terminal.

16. A non-transitory computer-readable medium comprising, stored thereupon, computer-executable program instructions that, when executed on a processing unit in a radio base station (RBS) that comprises a first radio unit (RU) and a second RU, cause the RBS to:

use the same scrambling or cell identity code in the first and second RUs for communication with a wireless communication terminal such that the wireless communication terminal will regard the first and second RUs as relating to the same cell of the RBS;

perform an RBS internal handover of said wireless communication terminal from said first RU to said second RU based on uplink transmission power received by the first and second RUs, respectively, from the wireless communication terminal;

control downlink transmission power of the first and second RUs independently of each other, based on uplink transmission power received by said first and second RUs, respectively, from the wireless communication terminal; and control any of the RUs to transmit at a reduced power or with no power if the uplink transmission power received by said any of the first and second RUs is below a pre-set threshold relative to the other RU.

17. A radio base station (RBS), comprising:

a first radio unit (RU) and a second RU, the RBS being configured such that said first and second RUs will use the same scrambling or cell identity code for communication with a wireless communication terminal such that the wireless communication terminal will regard the first and second RUs as relating to the same cell of the RBS;

an RBS internal handover circuit configured to facilitate a handover of the wireless communication terminal from the first RU to the second RU based on uplink transmission power received by the first and second RUs from the wireless communication terminal;

a narrow search window module configured to admit uplink transmission power received by any of the RUs within a narrow search window from the wireless communication terminal; and a wide area search module configured to detect uplink transmission power from the wireless communication terminal received outside of the narrow search window by any of the RUs, and configured to, if uplink transmission power from the wireless communication terminal is detected outside of the narrow search window, either move the narrow search window or increase the narrow search window or add new narrow search windows, in order to increase the received uplink transmission power.

* * * * *